March 15, 1960  G. A. GAYLER  2,928,962
FLYWHEEL MAGNETOS
Filed July 2, 1956  2 Sheets-Sheet 1

INVENTOR
GEORGE ALFRED GAYLER
BY
ATTORNEY

March 15, 1960  G. A. GAYLER  2,928,962
FLYWHEEL MAGNETOS

Filed July 2, 1956  2 Sheets-Sheet 2

INVENTOR
GEORGE ALFRED GAYLER
BY Paul M. Craig, Jr.
ATTORNEY

United States Patent Office 2,928,962
Patented Mar. 15, 1960

2,928,962

FLYWHEEL MAGNETOS

George Alfred Gayler, Bletchley, England, assignor to Wipac Development Limited, Bletchley, England Application July 2, 1956, Serial No. 595,416

Claims priority, application Great Britain July 6, 1955

6 Claims. (Cl. 310—153)

The present invention relates to flywheel magnetos of the type having as principal components a back plate, which is adapted to be fixed and carries the stator, having one or more wound poles, and a contact breaker, and a rotor in the form of a flywheel carrying one or more permanent magnets adapted to generate flux reversals in the stator winding when the flywheel rotates.

In known magnetos of this type the stator has been in the form of a laminated structure having a coil upon at least one polar extension thereof, this structure being mounted upon the back plate which plays no significant part in the magnetic circuit. The back plate is apertured to allow the coil to project therethrough when the laminated structure is fixed to the back plate.

The present invention has for its principal object to provide a flywheel magneto of the type specified which, while efficient, is cheaper to manufacture than known magnetos of this type.

According to the present invention there is provided a flywheel magneto of the type specified in which the back plate, which is of solid (unlaminated) magnetic material, itself forms at least a substantial part of the magnetic circuit of the stator and is shaped to provide integral portions thereof constituting or forming a substantial part of the stator poles, at least one of these being surrounded by a winding.

Figure 1:
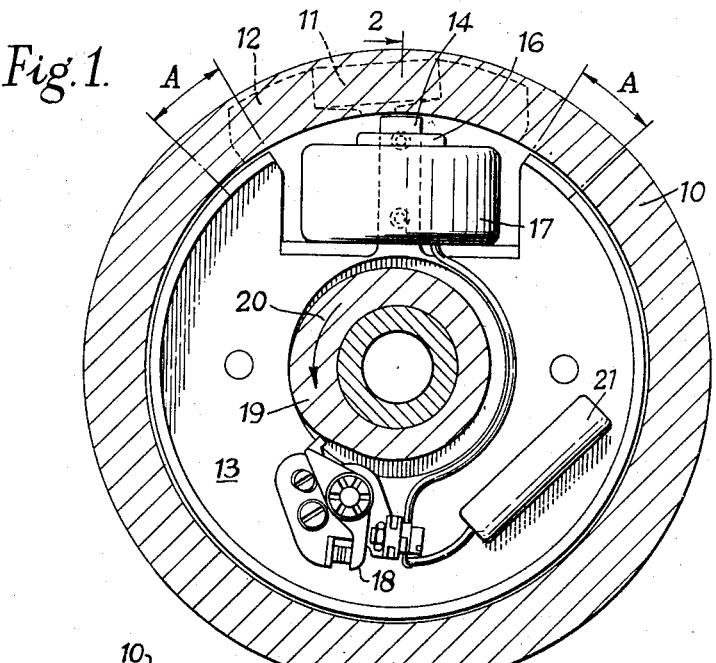
Figure 2:
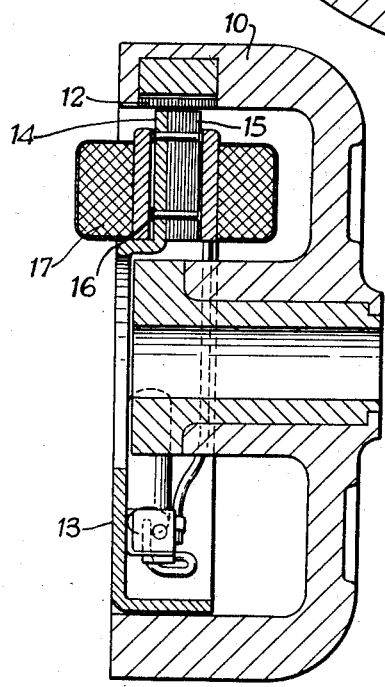
Figure 3:
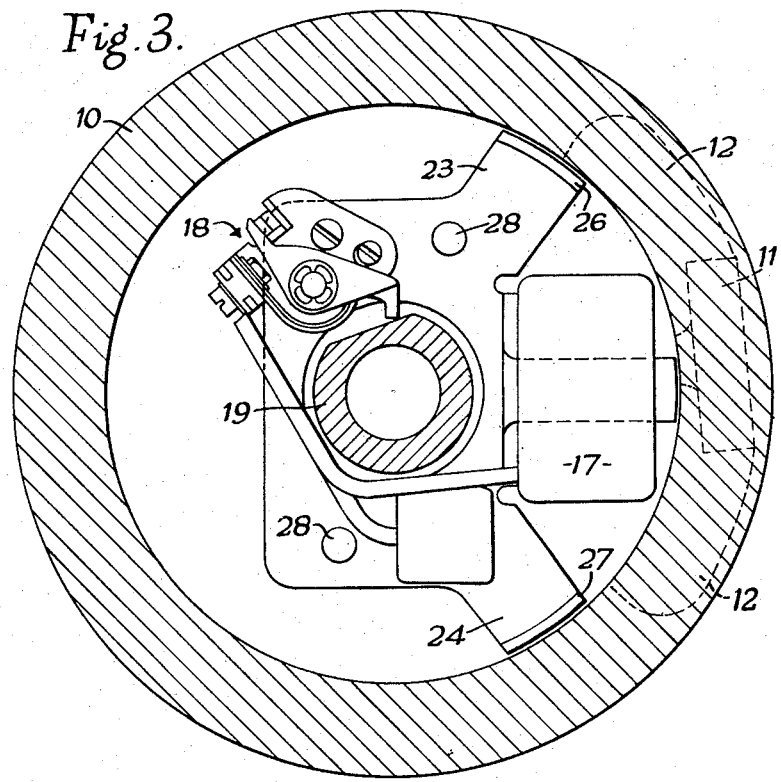
Figure 4:
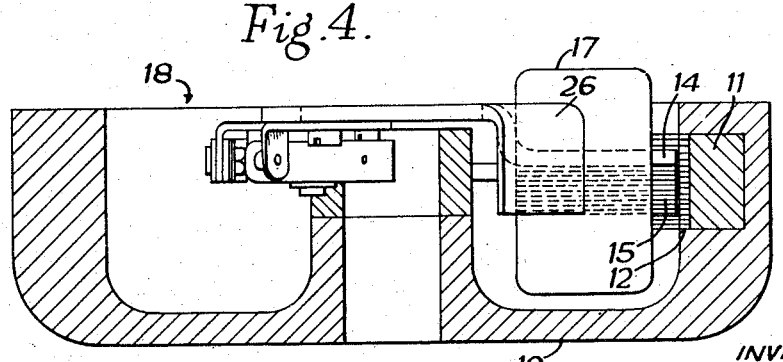

The invention will be described by way of example with reference to the accompanying drawing, in which Fig. 1 is a view of the embodiment in sectional elevation, Fig. 2 is a view in section on the line 2—2 of Fig. 1, and Figs. 3 and 4 are views corresponding to those of Figs. 1 and 2 respectively of a modified construction according to the invention.

In Figs. 1 and 2 a flywheel 10 of non-magnetic material, such as a zinc base or aluminium alloy, has cast therein a magnet 11 with a laminated pole piece structure 12.

A back plate 13 of steel is shaped to provide an integral pole 14 which is built up to approximately square cross-section by a magnetic body of laminations 15 riveted thereto. Upon this pole is mounted a former 16 carrying a coil 17. As shown, the back plate 13 is of dished shape, the central portion providing a flat mounting surface aproximately in the plane of one end surface of the flywheel rim and the other portion lying within the rim.

The back plate 13 carries a contact breaker 18 co-operating with a cam 19 rotating in the direction of the arrow 20 with the flywheel 10, and a condenser 21. When the relation between the pole 14 and the pole pieces 12 is as shown in Fig. 1, the contact breaker points are about to open.

In this embodiment the path of the magnetic flux is from the right hand pole of the magnet 11 in Fig. 1 and through the right hand laminated pole piece, the stator pole 14, 15 the body of the back plate 13 and the left hand laminated pole piece, to the left hand pole of the magnet 11.

If preferred, however, the return path for the magnetic flux, instead of being constituted by the whole of the back plate 13, may be limited to two outer poles extending over approximately the arcs shown at A, the remainder of the back plate being cut away excepting for such parts as are needed for mechanical reasons. The outer poles at A may be given a width sufficient to avoid the need to build them up to greater thickness with laminations, as is done in this embodiment for the pole 14, while providing an adequate cross-sectional area for the magnetic flux.

Thus, referring to Figs. 3 and 4, wherein the like parts are given the same references as in Figs. 1 and 2, the back plate comprises two polar portions 23 and 24 projecting radially outward from a central portion 25. The polar portions are bent over at 26 and 27 to provide surfaces of about the same axial extent as the pole pieces 12. The projecting portions 26 and 27 of the back plate form the sole magnetic elements of respective stator poles and at least a part of the back plate such as the central portion 25 constitutes substantially the sole magnetic circuit of the stator between the pole 14 and the respective poles 26 and 27 formed by the back plate. The central portion 25 has a size which need only be sufficient to provide a support for the contact breaker 18 and to act as a support for the stator. The back plate may be mounted by means of bolts passed through apertures 28.

In both illustrated embodiments of the invention, the pole faces of both the pole 14 and the other non-laminated projecting portions of the back plate 13 lie approximately in a cylindrical surface surrounded by a cylindrical face of the flywheel 10 within which the magnet 11 and pole pieces 12 are mounted.

I claim:

1. A flywheel magneto comprising a back plate of unlaminated magnetic material adapted to be fixed and shaped to provide at least three projecting fingers, a laminated body of magnetic material fixed to only one of said fingers and substantially co-extensive therewith, pole faces integral with said other fingers and lying, together with a pole face of said one finger, approximately in a cylindrical surface, at least one of said fingers forming the sole magnetic element of a respective pole of the stator and defining one of said pole faces, a stator winding upon said one finger, a contact breaker mounted upon said back plate, and a rotor, said rotor comprising a flywheel carrying at least one permanent magnet positioned to generate flux reversals through said pole faces and in said stator winding in response to rotation of said flywheel.

2. A flywheel magneto according to claim 1, wherein three of said fingers are provided two of which are at equal angles on either side of said one finger, the said winding being upon the said other finger.

3. A flywheel magneto comprising a back plate of unlaminated magnetic material adapted to be fixed and shaped to provide at least one projecting finger and at least one further projecting portion, said finger and said portion having pole surfaces lying approximately in a cylindrical surface and forming parts of a magnet circuit, said portion forming the sole magnetic element of a pole of the stator in said circuit and being unlaminated, a body of magnetic material fixed to and substantially co-extensive with said finger, a stator winding surrounding said finger and said magnetic body, a contact breaker mounted upon said back plate, and a rotor, said rotor comprising a flywheel carrying at least one permanent magnet positioned to generate flux reversals in said stator winding in response to rotation of said flywheel.

4. A flywheel magneto comprising a back plate of unlaminated magnetic material adapted to be fixed and shaped to provide at least one projecting finger and at least one further projecting portion, each said further projecting portion defining a stator pole, a laminated body of magnetic material fixed to and substantially co-extensive with said finger to define a further stator pole, the poles defined respectively by said finger and the laminated body and by each said projecting portion having pole surfaces lying approximately in a cylindrical surface and forming parts of a magnetic circuit, each said portion forming the sole magnetic element of a pole of the stator in said circuit and being unlaminated, a stator winding surrounding said finger and laminated body, a contact breaker mounted upon said back plate, and a rotor, said rotor comprising a flywheel carrying at least one permanent magnet positioned to generate flux reversals in said magnetic circuit and hence in said stator winding in response to rotation of said flywheel.

5. A flywheel magneto comprising a dished back plate of unlaminated magnetic material adapted to be fixed, the central portion of said back plate providing a flat mounting surface and the outer portion of said back plate being shaped to provide at least one projecting finger and at least one further projecting portion, said projecting portion defining a stator pole, a laminated body of magnetic material fixed to and substantially co-extensive with said finger to define a stator pole, each of said stator poles having pole surfaces lying approximately in a cylindrical surface and forming parts of a magnet circuit, each said projecting portion of said back plate forming the sole magnetic element of a respective pole of the stator and being unlaminated, a stator winding surrounding said finger and the laminated body thereon, a contact breaker mounted upon said central portion, and a rotor, said rotor comprising a flywheel having a rim surrounding said cylindrical surface and carrying at least one permanent magnet, and said rim being mounted with one end surface of said rim approximately in the plane of said mounting surface.

6. A flywheel magneto comprising a back plate of unlaminated magnetic material adapted to be fixed and shaped to provide a plurality of projecting portions as respective stator pole structures forming parts of a magnetic circuit, a body of magnetic material fixed to and substantially co-extensive with one of said projecting portions to form therewith one stator pole, at least another stator pole being formed solely by one of said projecting portions, said back plate having an unlaminated portion thereof intermediate said poles constituting substantially the only stator magnetic element between the respective poles and forming a part of said magnetic circuit, a stator winding surrounding said one of said stator pole projecting portions and said magnetic body, a contact breaker mounted upon said back plate and a rotor, said rotor comprising a flywheel carrying at least one permanent magnet positioned to generate flux reversals in said stator winding in response to rotation of said flywheel carrying said permanent magnet successively past said pole structures.

References Cited in the file of this patent

UNITED STATES PATENTS

| | | |
|---|---|---|
| 598,657 | Esson | Feb. 8, 1898 |
| 2,583,466 | Brownlee | Jan. 22, 1952 |